United States Patent [19]

Hefner, Jr.

[11] Patent Number: 4,766,184

[45] Date of Patent: Aug. 23, 1988

[54] POLYCARBONATE MODIFIED VINYL ESTERS

[75] Inventor: Robert E. Hefner, Jr., Lake Jackson, Tex.

[73] Assignee: The Dow Chemical Company, Midland, Mich.

[21] Appl. No.: 39,191

[22] Filed: Apr. 14, 1987

[51] Int. Cl.$^4$ .................................... C08F 283/02
[52] U.S. Cl. .................................... 525/463; 525/439; 525/468; 525/531
[58] Field of Search ............... 525/463, 468, 531, 523, 525/439

[56] References Cited

U.S. PATENT DOCUMENTS 3,098,056  7/1963  Schnell et al. ..................... 525/463

FOREIGN PATENT DOCUMENTS 0138389  4/1985  European Pat. Off. .
0125245  8/1982  Japan .

Primary Examiner—Theodore E. Pertilla
Attorney, Agent, or Firm—B. G. Colley

[57] ABSTRACT

Vinyl ester resins are prepared by the reaction of one or more epoxy resins with polycarbonate resins or oligomers and the reaction of this product with polymerizable ethylenically monounsaturated monocarboxylic acids. The epoxy resins can be advanced with polyphenols during the reaction and/or further reacted with monoalcohols or monophenols. The modified epoxy resins used to make the vinyl ester resins have chain branching and/or crosslinking due to carbonate bonding to polycarbonate chain scission products. The vinyl ester resins are useful to make moldings, coatings, laminates and filaments.

22 Claims, No Drawings

POLYCARBONATE MODIFIED VINYL ESTERS

BACKGROUND OF THE INVENTION

The present invention provides novel polycarbonate modified vinyl esters, as well as cured compositions prepared from said vinyl esters.

Vinyl esters are the reaction product of about equivalent amounts of a monounsaturated monocarboxylic acid and a polyepoxide. One class of vinyl esters is described in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl esters based on epoxy novolac resins are described in U.S. Pat. No. 3,301,743 to Fekete et al. Fekete et al describe vinyl esters where the molecular weight of the polyepoxide is increased by reacting a dicarboxylic acid with the polyepoxide resin as well as acrylic acid, etc. in U.S. Pat. No. 3,256,226. Other difunctional compounds containing a group which is reactive with an epoxide group, may be utilized in place of the dicarboxylic acid. All of the above-described resins, which contain the characteristic linkages

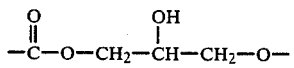

terminal polymerizable vinylidene groups are classified as vinyl esters.

The vinyl ester is typically combined with a reactive diluent, a copolymerizable vinyl monomer, to alter the viscosity of the mixture, to vary the properties of the cured coating, or for other known reasons. Most any vinyl monomer may be employed which is copolymerizable with the unsaturated groups of the vinyl ester. Such monomers include both monovinyl and polyvinyl monomers. Typical monomers include the alkenyl aromatic monomers such as styrene, α-methylstyrene, vinyltoluenes, t-butylstyrenes, and the like; and alkyl and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers are especially useful for ultra-violet light curable systems such as 2-acetoxyalkyl acrylates; pentaerythritol di-, tri- or tetra-acrylates and the like and may be added in any order.

The vinyl ester and copolymerizable vinyl monomer blend is a crosslinkable vinyl ester resin which is cured by mixing in a free radical forming catalyst in an amount ranging from 0.1 to about 5 percent by weight. Examples of these catalysts are benzoyl peroxide, t-butylhydroperoxide, methylethylketone peroxide and the like. It is frequently of value to add an accelerator such as N,N-dimethylaniline, cobalt naphthenate and the like.

The vinyl ester compositions of the present invention contain carbonate functionalities. These functionalities are those which were formed via transesterification reaction between the hydroxyl groups in the epoxy resin and carbonate groups in the polycarbonate or polycarbonate oligomer chains thus providing the precursor to the vinyl ester of the present invention. Reaction of this polycarbonate modified epoxy resin precursor with a monounsaturated monocarboxylic acid completes the synthesis of the compositions of the present invention. The polycarbonate modified vinyl ester resins when cured provide improved mechanical properties relative to their non-modified prior art counterparts.

SUMMARY OF THE INVENTION

One aspect of the present invention pertains to vinyl ester compositions comprising the reaction product of
 (A) a polymerizable ethylenically monounsaturated monocarboxylic acid with
 (B) the reaction product of
  (1) one or more epoxy resins with
  (2) from about 0.1 to about 10.0% by weight based on the total weight of the product of a polycarbonate resin or oligomer
whereby said epoxy resin is linked by one or more carbonate bonds to the tranesterification induced chain scission products of said polycarbonate to provide chain branching and or crosslinking of said epoxy resin.

Another aspect of the invention is the above vinyl ester composition which has reacted into said epoxy resin precursor
 (C) from about 0.1 to about 0.99 hydroxyl equivalents of a polyphenol per epoxide equivalents in said epoxy resin,
 (D) from about 1.0 to about 250% by weight of a monoalcohol or monophenol based on the weight of polycarbonate used, or
 (E) a mixture of (C) and (D).

Another aspect of the present invention concerns thermosettable (curable) compositions prepared by combining (A) one or more of the vinyl ester compositions with (B) at least one polymerizable ethylenically unsaturated monomer wherein said polymerizable ethylenically unsaturated monomer is present in an amount of from 1 to about 99, preferably from about 20 to about 80, most preferably from about 30 to about 70 percent by weight of the combined weight of components (A) and (B), Another aspect of the present invention concerns thermosettable (curable) compositions prepared by combining one or more of the vinyl ester of vinyl ester resin compositions with a curing quantity of at least one suitable catalyst and/or accelerator therefor.

DETAILED DESCRIPTION OF THE INVENTION

Suitable epoxy resins useful in the preparation of the polycarbonate modified epoxy resin precursor to the vinyl ester compositions include, for example, those represented by the formulas

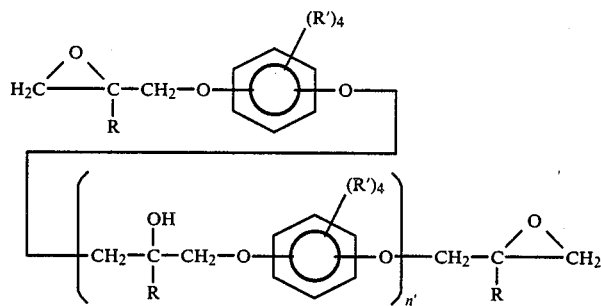
FORMULA I
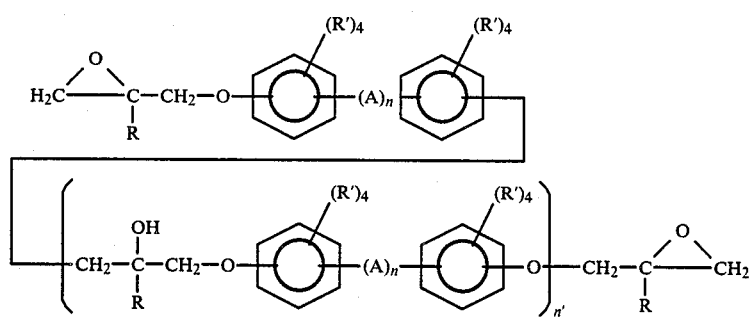
FORMULA II
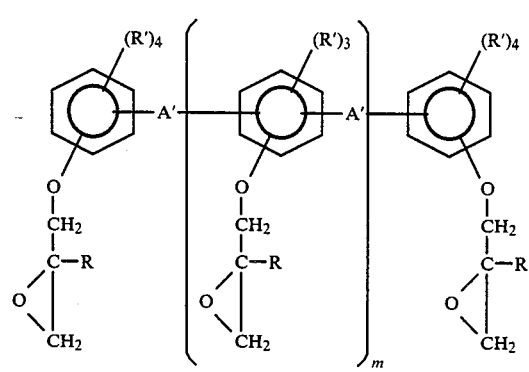
FORMULA III
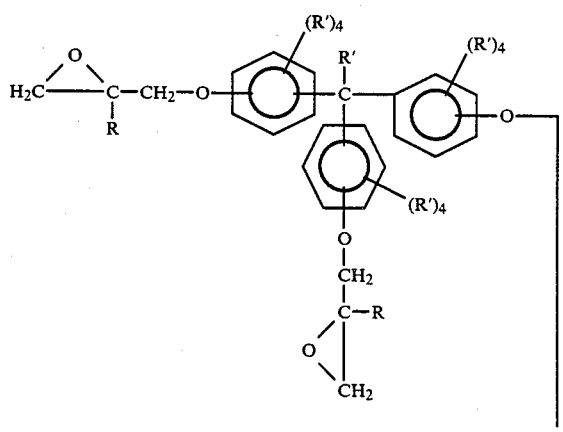
FORMULA IV

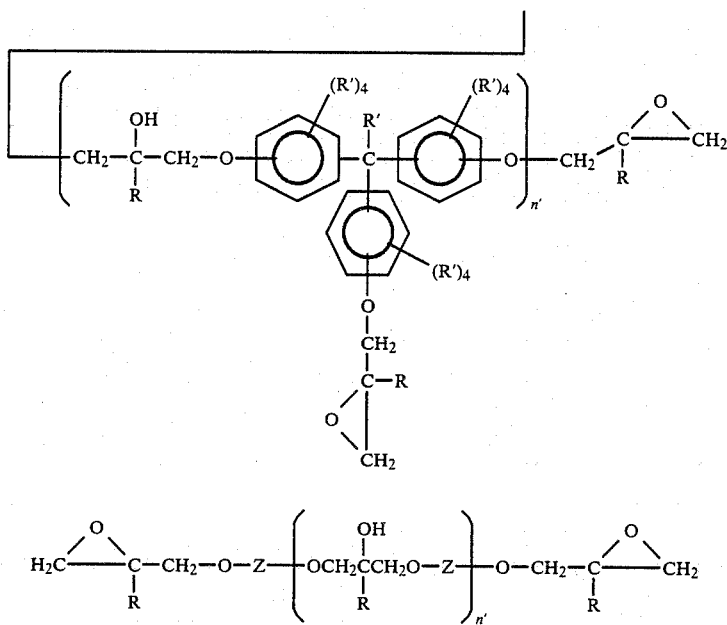

FORMULA V

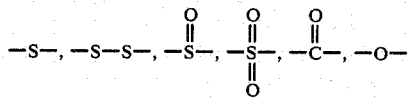

wherein A is a divalent hydrocarbon group having from 1 to about 12, preferably from 1 to about 6 carbon atoms, $$-S-, -S-S-, -\overset{O}{\underset{}{\overset{\|}{S}}}-, -\overset{O}{\underset{O}{\overset{\|}{\underset{\|}{S}}}}-, -\overset{O}{\underset{}{\overset{\|}{C}}}-, -O-$$

and the like; Z is a hydrocarbyl group containing from 1 to about 15 carbon atoms or a —C(R")$_2$—C(R"-)$_2$—[O—C(R")$_2$—C(R")$_2$]—m' group; A' is a divalent hydrocarbon group having from 1 to about 3, preferably 1, carbon atoms or a

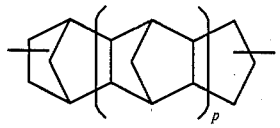

group; p has a value from zero to about 10, preferably from zero to 3; each R' is independently hydrogen, a hydrocarbyl or hydrocarbyloxy group having from 1 to about 18 carbon atoms or a halogen, preferably chlorine or bromine; R is independently hydrogen or a hydrocarbyl group having from 1 to about 3 carbon atoms; each R$^1$ is independently hydrogen or a hydrocarbyl group having from 1 to about 6 carbon atoms; n has a value from zero or 1; n' has a value from zero to about 40, preferably from 0.1 to about 5; m' has a value from 1 to about 100, preferably from 1 to about 25 and m has a value from about 0.001 to about 6.

The term hydrocarbyl as employed herein means any aliphatic, cycloaliphatic, aromatic, aryl substituted aliphatic, or aliphatic substituted aromatic groups. Likewise, the term hydrocarbyloxy group means a hydrocarbyl group having an oxygen linkage between it and the object to which it is attached.

Suitable epoxy resins which can be employed herein include, for example, the diglycidyl ethers of resorcinol, hydroquinone, catechol, bisphenol A (4,4'-isopropylidenediphenol), bis(4,4'-dihydroxyphenyl)methane, 2,2'-bis-(4-hydroxyphenyl)pentane, 3,3',5,5'-tetramethyl-4,4'-dihydroxydiphenyl, 4,4'-dihydroxydiphenyl sulfone, 4,4'-dihydroxybenzophenone, 3,3',5,5'-tetrabromo-4,4'-bis(p-hydroxyphenyl)diphenyl ether, 4,4'-dihydroxydiphenyl sulfide; the phenol-formaldehyde condensation products (novolacs); phenol-dicyclopentadiene condensation products; tris(hydroxyphenyl)methane; diglycidyl ethers of ethylene glycol, propylene glycol, diethylene glycol, dipropylene glycol, triethylene glycol, tripropylene glycol, butyleneglycol, polyethylene glycols, polypropylene glycols, polybutylene glycols, 1,12-dihydroxydodecane, 1,2-dihydroxyundecane, 1,6-hexanediol, 1,3-dihydroxy-2,2-dimethyl propane; diglycidyl ethers of cyclohexane dimethanol, dicyclopentadiene dimethanol, cyclohexanediol, norbornane dimethanol, hydrogenated bisphenol A; mixtures thereof and the like. Most preferred are the diglycidyl ethers of bisphenol A, bis(4,4'-dihydroxyphenyl)methane and mixtures of the diglycidyl ether of bisphenol A with the diglycidyl ether of dipropylene glycol, or a polypropylene glycol.

Suitable polycarbonates or polycarbonate oligomers are produced using methods well known to the prior art. Typical of such methods are those reported in *Encyclopedia of Polymer Science and Technology*, Volume 10, pages 710–764 (1969) published by John Wiley and Sons, Inc. and *Kirk-Othmer Encyclopedia of Chemical Technology*, Third Edition, Volume 18, pages 479–494 (1982) published by John Wiley and Sons, Inc. and incorporated herein by reference.

Preferred as the polycarbonate or polycarbonate oligomers are the aromatic polycarbonates or aromatic polycarbonate oligomers possessing phenolic hydroxyl, carboxylic acid or a mixture of said hydroxyl and carboxylic acid functionalities, non-reactive terminating groups, mixtures thereof and the like. Most preferred are aromatic polycarbonates or polycarbonate oligomers possessing phenolic hydroxyl terminal groups or possessing chain terminating groups derived from monophenols or substituted monophenols.

Preparation of a typical bisphenol A terminated polycarbonate oligomer preferred for use herein is taught by the examples. In the preparation, phosgene and bisphenol A are reacted in a specific manner to provide said phenolic hydroxyl terminated polycarbonate oligomer. Likewise, carboxylic terminated polycarbonate oligomers for use herein may be prepared by inclusion of p-hydroxybenzoic acid (or disodium salt of p-hydroxybenzoic acid) as a reactant. Various chain terminating agents, such as p-t-butylphenol, may also be included in the reaction.

Although less preferred, polyestercarbonates are also suitable for use herein. Preferred polyestercarbonates are the aromatic polyestercarbonate or aromatic polyestercarbonate oligomers possessing phenolic hydroxyl, carboxylic acid or a mixture of said hydroxyl and carboxylic acid functionalities, nonreactive terminating groups, mixtures thereof and the like. Most preferred are aromatic polyestercarbonates or aromatic polyestercarbonate oligomers possessing phenolic hydroxyl terminal groups or possessing chain terminating groups derived from monophenols or substituted monophenols.

If desired, one or more polyphenols may be used in the process of the present invention. Suitable polyphenols useful in the preparation of the polycarbonate modified epoxy resin precursor to the vinyl ester compositions include, for example, those represented by the formulas

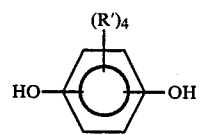
FORMULA VI

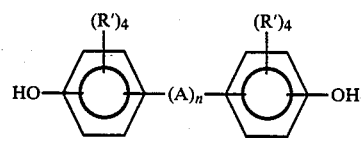
FORMULA VII

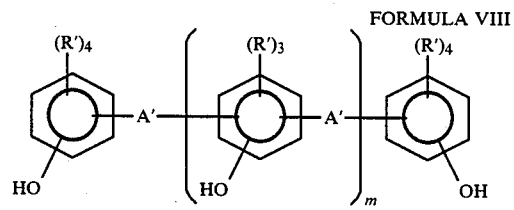
FORMULA VIII

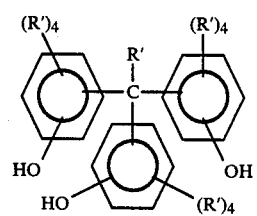
FORMULA IX wherein A, A', R', n and m are as hereinbefore defined.

Suitable polyphenols which can be employed herein include, for example, o-, m-, p-dihydroxybenzene, bisphenol A (4,4'-isopropylidenediphenol), bis(4,4'-dihydroxyphenyl)methane, 3,3',5,5'-tetramethyl-4,4'-dihydroxydiphenol, 4,4'-dihydroxydiphenyl sulfone, 4,4'-dihydroxy benzophenone, 3,3',5,5'-tetrabromo-4,4'-isopropylidenediphenol, 4,4'-bis(p-hydroxyphenyl)diphenyl ether, 4,4'-dihydroxydiphenyl sulfide, phenol-formaldehyde condensation products (novolacs), phenol-dicyclopentadiene condensation (novolacs) products, dicyclopentadiene diphenol, tricyclopentadiene diphenol, tris(hydroxyphenyl)methane, mixtures thereof and the like. Most preferred are bisphenol A and bis(4,4'-dihydroxyphenyl)methane.

A transesterification catalyst may optionally be employed to facilitate reaction of the secondary aliphatic hydroxyl groups present on the epoxy resin backbone with a polycarbonate or polycarbonate oligomer. Suitable transesterification catalysts which can be employed herein include, for example, dibutyltin laureate, dibutyltin oxide, tin octoate, tin oxide, $Sb_2O_3$, $Mn(CH_3CO_2)_2$, $Ca(CH_3CO_2)_2$, $Ti(OCH(CH_3)_2)_4$ mixtures thereof and the like. An amount of about 0.01 to about 2 percent by weight based on polycarbonate used is typically employed.

A monoalcohol or monophenol may optionally be employed as a reactant useful for modification of the polycarbonate or polycarbonate oligomer chain length. The monoalcohol or monophenol can be prereacted with the polycarbonate or polycarbonate oligomer prior to its reaction with an epoxy resin. Alternately, a monoalcohol can be used as a coreactant with the polycarbonate and epoxy resin. It is also operable to prereact the monophenol with the epoxy resin. This provides secondary aliphatic hydroxyl groups on the epoxy resin backbone which are available for reaction with the polycarbonate resin or oligomer. Primary and secondary monoalcohols are most preferred. Suitable monoalcohols and monophenols which can optionally be employed herein are those having 1 to 36 carbon atoms and include 1,3-diphenoxy-2-propanol, n-butanol, hexanol, octanol, 2-ethyl-1-hexanol, methanol, stearyl alcohol, mixtures thereof and the like. Suitable monophenols which can be employed herein are those having 6 to 36 carbon atoms and include p-methoxyphenol, naphthol, phenol, t-butyl phenol, monylphenol, mixtures thereof and the like. It is also operable to use mixtures of one or more monoalcohols and one or more monophenols herein. An amount of about 1.0 to about 250 percent by weight based on polycarbonate used is typically employed for both the monoalcohols and the monophenols. As is typical in transesterification chemistry, an excess of monoalcohol, for example, can be used to promote the transesterification reaction of the monoalcohol and polycarbonate. The excess of monoalcohol is then typically removed via conventional unit operations, such as vacuum stripping or distillation.

The polycarbonate or polycarbonate oligomer may be used neat or may be dissolved or slurried into a solvent inert to reaction with epoxide groups or the polycarbonate linkage. Useful solvents are halogenated hydrocarbons, aromatic hydrocarbons and aliphatic ketones. However, methylene chloride is preferred. It is most preferred to utilize the polycarbonate neat.

An advancement catalyst may be used in the process of the present invention. Suitable advancement catalysts which can be employed herein include most any catalyst which will catalyze the reaction between a vicinal epoxy group and a phenolic hydroxyl group or carboxylic acid group. Such catalysts include, for example, those disclosed in U.S. Pat. Nos. 3,306,872; 3,341,580; 3,379,684; 3,477,990; 3,547,881; 3,637,590; 3,843,605; 3,948,855; 3,956,237; 4,048,141; 4,093,650; 4,131,633;

4,132,706; 4,171,420; 4,177,216 which are incorporated herein by reference.

Particularly suitable catalysts are the quaternary phosphonium and ammonium compounds such as for example, ethyltriphenylphosphonium chloride, ethyltriphenylphosphonium bromide, ethyltriphenylphosphonium iodide, ethyltriphenylphosphonium acetate, ethyltriphenylphosphonium acetate.acetic acid complex, ethyltriphenylphosphonium phosphate, tetrabutylphosphonium chloride, tetrabutylphosphonium bromide, tetrabutylphosphonium iodide, tetrabutylphosphonium acetate, tetrabutylphosphonium acetate.acetic acid complex, butyltriphenylphosphonium tetrabromobisphenate, butyltriphenylphosphonium bisphenate, butyltriphenylphosphonium bicarbonate, benzyltrimethylammonium chloride, tetramethylammonium hydroxide, mixtures thereof and the like.

The reaction to produce the polycarbonate modified epoxy resin is usually conducted at a temperature of from about 75° C. to about 250° C., preferably from about 125° C. to about 220° C. for from about 15 minutes to about 480 minutes, preferably from about 30 minutes to about 120 minutes.

The term modified as used herein to describe the polycarbonate modified epoxy resin precursor to the vinyl ester refers to the transesterification reaction occurring between aliphatic hydroxyl groups, present in the epoxy resin and carbonate groups present in the polycarbonate or polycarbonate oligomer chains. The net result of this reaction is the formation of one or more new carbonate linkages that chemically bond the epoxy resin and polycarbonate or polycarbonate oligomer. It follows that transesterification reaction between two separate epoxy resin molecules and a single chain of polycarbonate provides a crosslink between said epoxy resin molecules.

A wide variety of process configurations are useful for preparing the polycarbonate modified epoxy resin precursors to the vinyl esters of the present invention. In the preferred process, the polycarbonate or polycarbonate oligomers are first added to the molten epoxy resin and substantially dissolved therein. The advancement catalyst, if used, may be added before, after, or concurrently with the polycarbonate or polycarbonate oligomers although it is most preferably added after the polycarbonate or polycarbonate oligomers have been substantially dissolved in the molten epoxy resin. When a transesterification catalyst is used, it may be added before, after or concurrently with the polycarbonate or polycarbonate oligomers, although it is preferably added after the polycarbonate or polycarbonate oligomers have been substantially dissolved in the molten epoxy resin. It is most preferred that a transesterification catalyst is not used. When a monoalcohol, monophenol or mixture thereof is used, it may be added before, after or concurrently with the polycarbonate or polycarbonate oligomers, although it is preferably added concurrently with or after the polycarbonate oligomers have been added to the molten epoxy resin.

In a most preferred process, the polycarbonate or polycarbonate oligomers are added to the molten epoxy resin and substantially dissolved therein. A polyphenol is added before, after, or concurrently with the polycarbonate or polycarbonate oligomers and substantially dissolved therein, although it is most preferably added after the polycarbonate or polycarbonate oligomers have been substantially dissolved in the molten epoxy resin. An advancement catalyst may be added at any point in the above sequence although it is most preferably added after the polycarbonate or polycarbonate oligomers and after the polyphenol have been substantially dissolved in the molten epoxy resin.

It is also operable to add portions of various of the reactants in stages. As a specific example, a portion of a polyphenol is added to the molten epoxy resin and substantially dissolved therein. An advancement catalyst is then added and the epoxy resin is partially or totally advanced via reaction with the added portion of polyphenol. The polycarbonate or polycarbonate oligomers are added to the molten partially or totally advanced epoxy resin and substantially dissolved therein. A second portion of polyphenol is then added, either with or without additional advancement catalyst, and reacted therein.

One or more solvents which are substantially inert to reaction with the epoxide group, carbonate linkage and phenolic hydroxyl or carboxylic acid groups, if present, may be used in the process of the present invention. Said solvents include the aromatic hydrocarbons, such as toluene, xylene; the chlorinated aliphatic hydrocarbons, such as perchloroethylene, methyl chloroform; the aliphatic ketones, such as methylisobutyl ketone, methylamyl ketone; the aliphatic ethers such as 1,4-dioxane, mixtures thereof and the like. A solvent may be used for many known purposes such as to reduce viscosity of the product or as a carrier for one or more of the reactants.

The polycarbonate modified epoxy resin precursors to the vinyl esters of the present invention contain carbonate linkages between the epoxy resin and the transesterification induced chain scission products of the polycarbonate or polycarbonate oligomer. These linkages are formed via transesterification reaction between the hydroxyl groups in the epoxy resin and carbonate groups in the polycarbonate or polycarbonate oligomer chains. Sources of hydroxyl groups in the epoxy resins include the characteristic secondary aliphatic hydroxyl groups present in the epoxy resin backbone as a result of advancement reaction and glycol groups (1,2-diol) present as a result of epoxide group hydrolysis. If the polycarbonate or polycarbonate oligomer contains terminal phenolic hydroxyl and/or carboxylic acid groups, these are also incorporated into the epoxy resin via conventional advancement reaction with epoxide groups. Furthermore, phenolic hydroxyl groups which form as a coproduct of the aforesaid transesterification reaction can also be incorporated into the epoxy resin via conventional advancement reaction with epoxide groups and thus lead to an additional supply of reactive secondary aliphatic hydroxyl groups within the epoxy resin. The following model reaction clearly demonstrates the transesterification reaction between the carbonate linkage and a secondary hydroxyl group such as is present on the epoxy resin backbone or such as may be induced by the optional use of a secondary monoalcohol as a coreactant:

Model Reaction of Secondary Hydroxyl Group and Aromatic Carbonate Group

A portion of 1,3-diphenoxy-2-propanol and diphenyl carbonate were mixed together at a 2:1 equivalent ratio then heated to 100° C. After 1 hour (3600 s) of reaction, a sample of the reaction product was analyzed by gas chromatography for disappearance of diphenyl carbonate. The gas chromatographic analysis demonstrated that disappearance of 27.8 percent by weight of the diphenyl carbonate had occurred. Reaction was attributed to transesterification reaction between the secondary hydroxyl group of 1,3-diphenoxy-2-propanol and the carbonate linkage of diphenyl carbonate.

Suitable monounsaturated monocarboxylic acids and/or monounsaturated half-esters of a dicarboxylic acid for reaction with the polycarbonate modified epoxy resins include acrylic acid, methacrylic acid, cyanoacrylic acid, crotonic acid, α-phenylacrylic acid, methoxyacrylic acid, the monomethyl ester of fumaric acid, cinnamic acid and the like or mixtures thereof. Methacrylic acid is a most preferred monounsaturated monocarboxylic acid. The reaction between the polycarbonate modified epoxy resin and a monounsaturated monocarboxylic acid and/or monounsaturated half-ester of a dicarboxylic acid is typically performed in the presence of a catalyst. Suitable catalysts for use herein are well known in the prior art. Chromium trichloride, tris(dimethylaminoethyl)phenol and ethyltriphenylphosphonium acetate.acetic acid complex are most preferred as the catalysts. A quantity of frm about 0.01 to about 2 percent by weight has been found to be a particularly suitable quantity of catalyst with concentrations of 0.1 to about 0.3 weight percent of the total reactants used being most preferred.

A suitable process inhibitor is typically used in the reaction between the polycarbonate modified epoxy resin and the monounsaturated monocarboxylic acid and/or monounsaturated half-ester of a dicarboxylic acid to prevent gelation (homopolymerization of the vinyl ester and/or copolymerization of the vinyl ester with unreacted monounsaturated monocarboxylic acid and/or monounsaturated half-ester of a dicarboxylic acid). Suitable inhibitors for use herein are well known in the prior art. Hydroquinone activated with air is a most preferred inhibitor at concentrations of from about 100 ppm to about 500 ppm based on the weight of the polycarbonate modified epoxy resin and monounsaturated monocarboxylic acid and/or monounsaturated half-ester of a dicarboxylic acid used.

The reaction to produce the polycarbonate modified vinyl ester is usually conducted at a temperature of from about 50° C. to about 125° C., preferably from about 80° C. to about 120° C. for from about 60 minutes to about 720 minutes, preferably from about 120 minutes to about 480 minutes. Although reaotion times and reaction temperatures can vary substantially, most preferred vinyl ester compositions are obtained by reacting to a specific conversion, typically 1.5 to 0.25 percent carboxylic acid.

The polycarbonate modified vinyl ester is typically combined with one or more reactive diluents, such as copolymerizable ethylenically unsaturated compounds.

A wide selection of polymerizable monomers containing a

group is available from the many known classes of vinyl monomers. Representative species are the vinyl aromatic compounds which include such monomers as styrene, α-methylstyrene, vinyl toluenes, halogenated styrenes, t-butylstyrene, divinyl benzene and the like.

Other suitable monomers include the methyl, ethyl, isopropyl, octyl and the like esters of acrylic or methacrylic acid, vinyl acetate, diallyl maleate, dimethallyl fumarate, acidic monomers such as acrylic acid, methacrylic acid, crotonic acid, amide monomers such as acrylamide, N-alkylacrylamides and hydroxyl monomers such as the hydroxyalkyl esters of acrylic, methacrylic and crotonic acid, mixtures thereof and the like.

Most preferred monomers include styrene, vinyltoluenes, halostyrenes, vinyl naphthalene, the various α-methyl substituted styrenes, polyhalostyrenes and the saturated alcohol esters of acrylic and methacrylic acids.

The blended polycarbonate modified vinyl ester resin may consist of up to 99 percent by weight of polymerizable ethylenically unsaturated compound with the balance of the combined weight consisting of said polycarbonate modified vinyl ester. Most preferably, the resin composition consists of about 30 to about 70 percent by weight of said polymerizable ethylenically unsaturated compound and about 70 to about 30 percent by weight of said vinyl ester.

While it is preferred in many applications to blend the polycarbonate modified vinyl ester resin with a polymerizable ethylenically unsaturated compound, the present invention is not limited thereto. The polycarbonate modified vinyl ester can be cured (homopolymerized) in the absence of a polymerizable ethylenically unsaturated compound and can be applied and utilized as solutions in a nonpolymerizable solvent, such as is practiced in certain coating operations.

According to the present invention, the curing of the resin compositions is effected by the application of heat and/or pressure, preferably in the presence of one or more free radical forming catalysts. Suitable free radical forming catalysts include the peroxides and hydroperoxides such as benzoyl peroxide, lauroyl peroxide, t-butyl hydroperoxide, methylethylketone peroxide, potassium persulfate and the like. The amount of catalyst added typically varies from about 0.5 to about 2 percent by weight of resin. Additionally, curing may be carried out in the presence of about 0.01 to about 2 percent by weight of an accelerating agent, such as cobalt naphthenate, N,N-dimethylaniline, and the like. Curing temperatures may vary over a considerable range but usually are in the range of 20° C. to 250° C., preferably 25° C. to 175° C.

Additional compositions of the present invention also include blends of the polycarbonate modified vinyl ester resins and the vinyl ester resins of the prior art, as well as the cured compositions from said blends. Representative of said prior art vinyl ester resins include those disclosed in U.S. Pat. Nos. 3,367,992; 3,066,112; 3,179,623; 3,301,743 and 3,256,226 which are incorporated herein by reference.

The polycarbonate modified vinyl ester resins of the present invention are useful to make laminates, castings, coatings, encapsulations and the like. The laminates are made by curing the aforesaid vinyl ester resin to which a suitable fibrous reinforcement such as asbestos fibers, carbon fibers, fibrous glass, aramid fibers or inorganic fibers has been added. The fibers may be in the form of mats, strands, sheets, filaments, yarns, chopped strands, ribbons and the like. The aforesaid vinyl ester resin formulation can be rolled, sprayed or impregnated into the fibrous reinforcement.

The polycarbonate modified vinyl ester resins may be compounded with solvents, pigments, fire suppressants, low profile additives, thickening agents, fillers or other resinous products and cured to form useful coatings in a manner well known in the art.

The compositions of the present invention have properties that make them well adapted for molding, pultrusion, filament winding, coating, laminating and other known fabrication procedures. A preferred use is in fabricated parts where increased mechanical strength is required. Typical of these applications are pultrusion-formed oil well sucker rods, composite aircraft parts, as well as filament wound large and small diameter pipe.

The following examples are illustrative of the present invention, but are not to be construed as to limiting the scope thereof in any manner.

EXAMPLE 1

A. Preparation of Bisphenol A Terminated Polycarbonate Oligomers

Bisphenol A (272.4 grams), methylene chloride (1000 milliliters), water (1350 milliliters) and 50 percent aqueous sodium hydroxide (194.0 grams) were added to a reactor and rapidly stirred. A total of 150.0 grams of phosgene and 96.0 grams of 50 percent aqueous sodium hydroxide solution were fed into the reaction mixture. The first 89.0 grams of phosgene were fed into the reactor over a 17.5 minute period during which time the reaction temperature was allowed to increase from 25° C. to 30° C. The aqueous sodium hydroxide solution was fed into the reactor over a 27 minute period at which time 137.0 grams of phosgene had been fed. A final pH of 11 was achieved at the end of the phosgene addition. Thirty-two minutes after the inception of the phosgene and aqueous sodium hydroxide feeds, the reaction mixture was quenched with an aqueous disodium bisphenate solution prepared by mixing 119 grams of bisphenol A, 800 milliliters of water and 83.0 grams of 50 percent aqueous sodium hydroxide. Eighteen minutes after addition of the disodium bisphenate solution, the pH was 12.6. The milky organic layer was separated and washed with water to a pH of 11 followed by addition of 100 milliliters of 10 percent aqueous hydrochloric acid. Multiple water washes were completed followed by drying of the emulsion over silica gel and filtration through diatomaceous earth. The recovered organic solution was poured into a pan, solvent evaporated and drying under vacuum at 90° C. completed for two hours. The bisphenol A terminated polycarbonate oligomer product (312 grams) was recovered as a white powder. Weight average molecular weight was 6574, number average molecular weight was 3191, melting point was 242° C., glass transition temperature was 133° C. and phenolic hydroxyl group content was 1450 ppm.

B. Preparation of Polycarbonate (one percent by weight) Modified Epoxy Resin A portion (500 grams) of a diglycidyl ether of bisphenol A having an epoxide equivalent weight (EEW) of 181.53 was added to a reactor and heated with stirring under a nitrogen atmosphere to 160° C. Once the 160° C. reaction temperature was achieved, a bisphenol A terminated polycarbonate (5.39 grams, one percent by weight based on epoxy resin and bisphenol A used) having an average molecular weight of 6400 and prepared using the method of A above was added. After 20 minutes at the 160° C. temperature, bisphenol A (39.3 grams) was added to the reactor, then cooling commenced. After 8 minutes, a reaction temperature of 95° C. was achieved, then ethyltriphenylphosphonium acetate.acetic acid complex (0.40 gram) was added to the reactor and heating of the reactor contents resumed. After 29 minutes, a reaction temperature of 150° C. was achieved followed by an exotherm to 163° C. four minutes later. After an additional 19 minutes, the 150° C. temperature was reachieved then cooling to 120° C. commenced. The 120° C. reaction temperature was reached seven minutes later followed by filtration, then the modified epoxy resin was recovered as a light yellow colored, transparent liquid with an EEW of 226.73.

C. Preparation of Polycarbonate Modified Vinyl Ester Resin

A portion (250 grams) of the polycarbonate modified advanced diglycidyl ether of bisphenol A from B above was added to a reactor and heated to 90° C. When the 90° C. reaction temperature was achieved, an air sparge was started (0.5 liter per minute) then hydroquinone (400 ppm, 0.1368 gram) was added, followed by glacial methacrylic acid (91.98 grams, 1.07 moles), five minutes later. Four minutes later, the 90° C. reaction temperature was reachieved, then aqueous chromium trichloride (33⅓%) catalyst (0.3125 gram, 0.125 percent by weight based on epoxy resin used) was added to the reactor. The reaction temperature was increased to 110° C., then two minutes after the 110° C. temperature was achieved, the reaction temperature was increased to 115° C. After 352 minutes of reaction at the 115° C. temperature, titration of a sample of the vinyl ester demonstrated the presence of 1.00 percent carboxylic acid and 1.00 percent epoxide. The reactor contents were cooled to 80° C., then phenothiazine (0.0672 gram, 200 ppm) was added followed by styrene (223.87 grams, 40.0 percent by weight) five minutes later. The reactor contents were maintained at 50° C. with stirring for 90 minutes followed by filtration of the transparent, pale yellow colored vinyl ester resin product.

EXAMPLE 2

A. Preparation of Polycarbonate (2.5 percent by weight) Modified Epoxy Resin A portion (500 grams) of a diglycidyl ether of bisphenol A having an epoxide equivalent weight of 181.53 was added to a reactor and heated with stirring under a nitrogen atmosphere to 160° C. Once the 160° C. reaction temperature was achieved, a bisphenol A terminated polycarbonate (13.5 grams, 2.5 percent by weight based on epoxy resin and bisphenol A used) having an average molecular weight of 6400 was added. After 45 minutes at the 160° C. temperature, bisphenol A (39.3 grams) was added to the reactor, then cooling commenced. After 7 minutes, a reaction temperature of 98° C. was achieved, then ethyltriphenylphosphonium acetate.acetic acid complex (0.40 gram) was added to the reactor and heating of the reactor contents resumed. After 18 minutes, a reaction temperature of 150° C. was achieved followed by an exotherm to 167° C. five minutes later. After an additional 20 minutes, the 150° C. temperature was reachieved then cooling to 120° C. commenced. The 120° C. reaction temperature was reached five minutes later followed by filtration, then the modified epoxy resin was recovered as a light yellow colored, transparent liquid with an EEW of 238.52.

B. Preparation of Polycarbonate Modified Vinyl Ester Resin

A portion (250 grams) of the polycarbonate modified advanced diglycidyl ether of bisphenol A from A above was added to a reactor and heated to 90° C. When the 90° C. reaction temperature was achieved, an air sparge was started (0.5 liter per minute) then hydroquinone (400 ppm, 0.1350 gram) was added, followed by glacial methacrylic acid (87.44 grams, 1.02 moles), five minutes later. Four minutes later, the 90° C. reaction temperature was reachieved, then aqueous chromium trichloride (33⅓%) catalyst (0.3125 gram, 0.125 percent by weight based on epoxy resin used) was added to the reactor. The reaction temperature was increased to 110° C., then two minutes after the 110° C. temperature was achieved, the reaction temperature was increased to 115° C. After 326 minutes of reaction at the 115° C. temperature, titration of a sample of the vinyl ester demonstrated the presence of 0.95 percent carboxylic acid and 1.02 percent epoxide. The reactor contents were cooled to 80° C., then phenothiazine (0.0668 gram, 200 ppm) was added followed by styrene (222.69 grams, 40.0 percent by weight) five minutes later. The reactor contents were maintained at 50° C. with stirring for 90 minutes followed by filtration of the transparent, pale yellow colored vinyl ester resin product.

EXAMPLE 3

A. Preparation of Polycarbonate (five percent by weight) Modified Epoxy Resin A portion (500 grams) of a diglycidyl ether of bisphenol A having an epoxide equivalent weight (EEW) of 181.53 was added to a reactor and heated with stirring under a nitrogen atmosphere to 162° C. Once the 162° C. reaction temperature was achieved, a bisphenol A terminated polycarbonate (26.97 grams, five percent by weight based on epoxy resin and bisphenol A used) having an average molecular weight of 6400 was added. After 51 minutes at the 162° C. temperature, bisphenol A (39.3 grams) was added to the reactor, then cooling commenced. After 12 minutes, a reaction temperature of 101° C. was achieved, then ethyltriphenylphosphonium acetate.acetic acid complex (0.45 gram) was added to the reactor and heating of the reactor contents resumed. After 29 minutes, a reaction temperature of 150° C. was achieved followed by an exotherm to 160° C. five minutes later. A reaction temperature of 155° C. was achieved and held over the next 56 minutes then cooling to 120° C. commenced. The 120° C. reaction temperature was reached 5 minutes later followed by filtration, then the modified epoxy resin was recovered as a light yellow colored, transparent liquid with an EEW of 58.72.

B. Preparation of Polycarbonate Modified Vinyl Ester Resin

A portion (250 grams) of the polycarbonate modified advanced diglycidyl ether of bisphenol A from A above was added to a reactor and heated to 90° C. When the 90° C. reaction temperature was achieved, an air sparge was started (0.5 liter per minute) then hydroquinone (400 ppm, 0.1322 gram) was added, followed by glacial methacrylic acid (80.61 grams, 0.937 mole), five minutes later. Seven minutes later, the 90° C. reaction temperature was reachieved, then aqueous chromium trichloride (33⅓%) catalyst (0.3125 gram, 0.125 percent by weight based on epoxy resin used) was added to the reactor. The reaction temperature was increased to 110° C., then two minutes after the 110° C. temperature was achieved, the reaction temperature was increased to 115° C. After 407 minutes of reaction at the 115° C. temperature, titration of a sample of the vinyl ester demonstrated the presence of 1.15 percent carboxylic acid and 0.98 percent epoxide. The reactor contents were cooled to 80° C., then phenothiazine (0.0647 gram, 200 ppm) was added, followed by styrene (215.67 grams, 40.0 percent by weight) five minutes later. The reactor contents were maintained at 50° C. with stirring for 90 minutes followed by filtration of the transparent, pale yellow colored vinyl ester resin product.

COMPARATIVE EXPERIMENT 1

A. Preparation of Bisphenol A Advanced Epoxy Resin

A portion (500 grams) of a diglycidyl ether of bisphenol A having an epoxide equivalent weight (EEW) of 181.53 was added to a reactor and heated with stirring under a nitrogen atmosphere to 160° C. Bisphenol A (39.3 grams) was added to the reactor, then cooling commenced. After 23 minutes, a reaction temperature of 98° C. was achieved, then ethyltriphenylphosphonium acetate.acetic acid complex (0.40 gram) was added to the reactor and heating of the reactor contents resumed. After 18 minutes, a reaction temperature of 150° C. was achieved followed by an exotherm to 163° C. four minutes later. After an additional 15 minutes, the 150° C. temperature was reachieved then cooling to 120° C. commenced. The 120° C. reaction temperature was reached 5 minutes later followed by filtration, then the bisphenol A advanced epoxy resin was recovered as a light yellow colored, transparent liquid with an EEW of 220.32.

B. Preparation of Vinyl Ester Resin

A portion (250 grams) of the bisphenol A advanced epoxy resin from A above was added to a reactor and heated to 90° C. When the 90° C. reaction temperature was achieved, an air sparge was started (0.5 liter per minute) then hydroquinone (400 ppm, 0.1379 gram) was added, followed by glacial methacrylic acid (94.66 grams, 1.101 moles), five minutes later. Three minutes later, the 90° C. reaction temperature was reachieved, then aqueous chromium trichloride (33⅓%) catalyst (0.3125 gram, 0.125 percent by weight based on epoxy resin used) was added to the reactor. The reaction temperature was increased to 110° C., then two minutes after the 110° C. temperature was achieved, the reaction temperature was increased to 115° C. After 419 minutes of reaction at the 115° C. temperature, titration of a sample of the vinyl ester demonstrated the presence of 1.07 percent carboxylic acid and 1.01 percent epoxide. The reactor contents were cooled to 80° C., then phenothiazine (0.0680 grams, 200 ppm) was added followed by styrene (226.61 grams, 40.0 percent by weight) five minutes later. The reactor contents were maintained at 50° C. with stirring for 90 minutes followed by filtration of the transparent, pale yellow colored vinyl ester resin product.

EXAMPLE 4

Portions of the vinyl ester resins of Examples 1-C, 2-B, 3-B and Comparative Experiment 1-B were used to prepare clear, unfilled ⅛ inch castings for heat distortion temperature (264 psi), tensile and flexural strength, flexural modulus, percent elongation and average Barcol Hardness (934-1 scale) determinations. Each casting was cured at room temperature (25° C.) using a cure system of 1.0 percent by weight benzoyl peroxide and 0.05 percent by weight N,N-dimethylaniline. Twenty-four hours after the cure exotherm had subsided, post curing for 2 hours at 100° C. was completed. Mechanical properties of tensile (8) and flexural (6) test pieces were determined using an Instron machine with standard test methods (ASTM D-638 and D-790). Heat distortion temperature of clear casting test pieces (2) was determined using an Aminco Plastic Deflection Tester (American Instrument Co.) with standard test methods (ASTM D-648 modified by use of ⅛ inch thick test pieces). Brookfield viscosity of each vinyl ester resin was measured at 25° C.±1° C. and SPI gel tests were completed at 84° C.±1° C. using 1 percent by weight benzoyl peroxide catalyst. The results are reported in Table 1.

TABLE I

|  | Example 1-B | Example 2-B | Example 3-B | Comparative Experiment 1 |
|---|---|---|---|---|
| Brookfield Viscosity, cp | 100.3 | 121.8 | 168.5 | 87.5 |
| SPI Gel Test (84° C.) | | | | |
| gel time (minutes) | 19.75 | 17.5 | 19.5 | 19.6 |
| cure time (minutes) | 21.8 | 19.6 | 21.5 | 21.7 |
| maximum exotherm (°F./°C.) | 388/197.8 | 396/202.2 | 398/203.3 | 391/199.4 |
| Barcol Hardness | 46 | 46 | 44 | 45 |
| Tensile Strength, psi kPa | 13,174 | 13,242 | 13,137 | 12,670 |
| Elongation, % | 5.83 | 6.44 | 5.74 | 4.05 |
| Flexural Strength, psi kPa | 24,382 | 23,735 | 24,738 | 24,282 |
| Flexural Modulus, psi kPa | 513,000 | 510,000 | 569,000 | 519,000 |
| Heat Distortion Temperature | | | | |
| °F. | 230 | 241.7 | 237 | 236.8 |
| °C. | 110 | 116.5 | 113.8 | 113.8 |

I claim:

1. A vinyl ester composition comprising the reaction product of
(A) a polymerizable ethylenically monounsaturated monocarboxylic acid with
(B) the reaction product of
  (1) one or more epoxy resins with
  (2) from about 0.1 to about 10.0% by weight based on the total weight of the product of a polycarbonate resin or oligomer
whereby said epoxy resin is linked by one or more carbonate bonds to the transesterification induced chain scission products of said polycarbonate to provide chain branching and or crosslinking of said epoxy resin.

2. The composition of claim 1 which has reacted into said epoxy resin precursor to the vinyl ester composition
(C) from about 0.1 to about 0.99 hydroxyl equivalents of a polyphenol per epoxide equivalents in said epoxy resin,
(D) from about 1.0 to about 250% by weight of a monoalcohol or monophenol based on the weight of polycarbonate used, or
(E) a mixture of (C) and (D).

The composition of claim 1 wherein the epoxy resin has the structure set forth in one of the formulas I-V

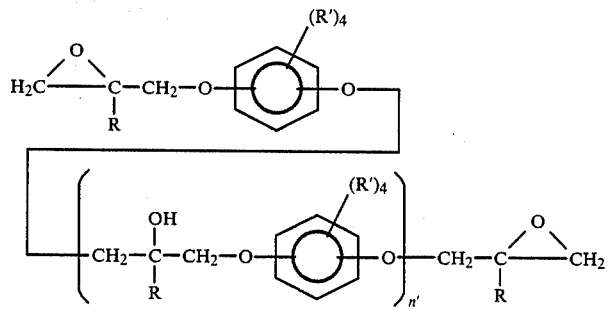

FORMULA I

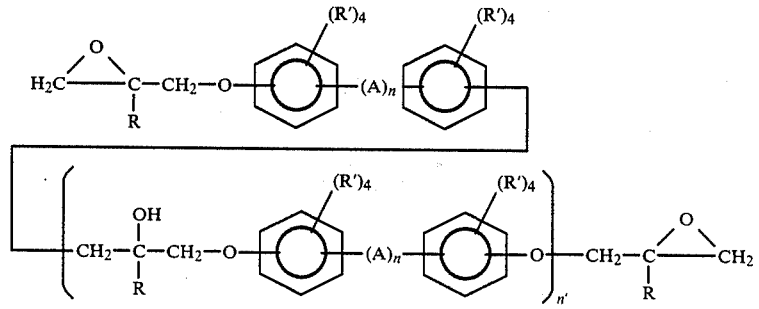

FORMULA II

-continued
FORMULA III
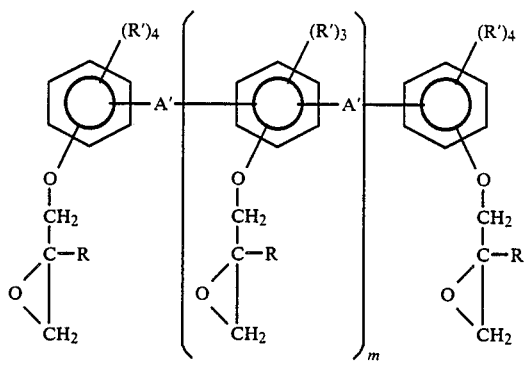
FORMULA IV
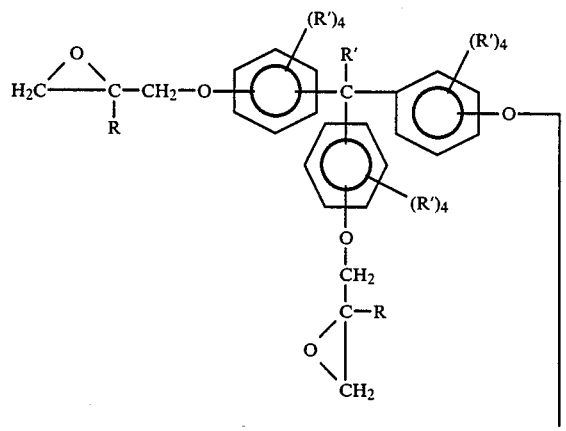
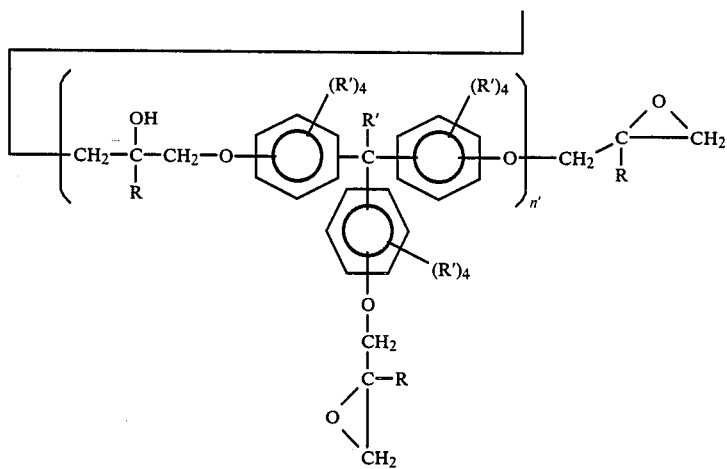
FORMULA V
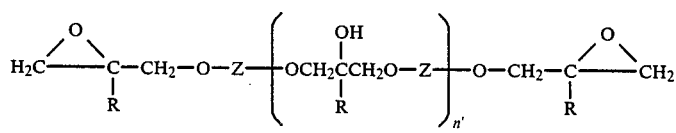
wherein
3. A is selected from the group consisting of divalent hydrocarbon groups having 1–12 carbons,
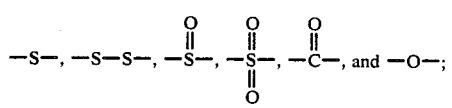
Z is a hydrocarbyl group having 1–15 carbons or a group having the formula
$-C(R'')_2-C(R'')_2-[O-C(R'')_2-C(R'')_2]m'-$;
A' is a divalent hydrocarbon group having 1–3 carbons or a group having the formula

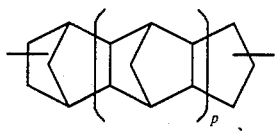

p is 0 to 10;

R' is independently hydrogen, a hydrocarbyl or hydrocarbyloxy group having 1-18 carbons or a halogen;

R is independently hydrogen or a hydrocarbyl group having 1-3 carbons;

R" is independently hydrogen or a hydrocarbyl group having 1-6 carbons;

n is 0 or 1;

n' has an average value from zero to about 40; m has an average value from about 0.001 to about 6; and m' has a value from 1 to about 100.

4. A curable composition comprising the vinyl ester composition of claim 1 with an amount of a catalyst and/or accelerator effective to cure said vinyl ester composition.

5. A curable composition comprising the vinyl ester composition of claim 2 with an amount of a catalyst and/or accelerator effective to cure said vinyl ester composition.

6. A curable composition comprising the vinyl ester composition of claim 3 with an amount of a catalyst and/or accelerator effective to cure said vinyl ester composition.

7. The cured product of claim 4.

8. The cured product of claim 5.

9. The cured product of claim 6.

10. A process for preparing a vinyl ester wherein (1) at least one epoxy resin and (2) at least one polycarbonate resin or oligomer are reacted together at a time and temperature sufficient to induce formation of one or more carbonate linkages on said epoxy resin and provide chain branching and/or crosslinking in said epoxy resin to form a polycarbonate modified epoxy resin which is reacted with (3) a polymerizable ethylenically monounsaturated monocarboxylic acid.

11. The process of claim 10 wherein component (2) is present in an amount of from about 0.1 to 10.0% by weight based on the combined weights of components (1) and (2), component (3) is present in an amount to provide an equivalent ratio of carboxylic acid groups to epoxide groups of from about 0.75:1 to about 1.2:1, a reaction time of at least about 15 minutes is used, a reaction temperature of about 75° C. to about 125° C. is used.

12. The process of claim 11 wherein one or more polyphenols are additionally present before or during the reaction in an amount of from about 0.01 to about 0.99 hydroxyl equivalents per epoxide equivalent contained in component (1).

13. The process of claim 12 wherein component (2) is first added to component (1) and substantially dissolved therein followed by addition of said polyphenol.

14. The process of claim 12 wherein said polyphenol is first added to component (1) followed by addition of component (2).

15. The process of claim 12 wherein from about 0.01 to about 0.75 hydroxyl equivalents per epoxide equivalent contained in component (1) of said polyphenol is first added to component (1) and substantially dissolved therein followed by addition of component (2) which is substantially dissolved therein followed by addition of from about 0.24 to about 0.98 hydroxyl equivalents per epoxide equivalent contained in component (1) of said polyphenol.

16. The process of claim 10 wherein one or more monoalcohols or monophenols are additionally present in an amount of from about 1.0 to about 250 percent by weight based on the weight of component (2) in the reaction to prepare the epoxy resin precursor.

17. The process of claim 12 wherein one or more monoalcohols or monophenols are additionally present in an amount of from about 1.0 to about 250 percent by weight based on the weight of component (2) in the reaction to prepare the epoxy resin precursor.

18. The process of claim 17 wherein components (1), (2) and said monoalcohols or monophenols are contacted together prior to addition of said polyphenol.

19. The process of claims 10, 11, 12, 13, 14, 15 or 16 wherein one or more solvents substantially inert to reaction with epoxide groups or the carbonate linkage are additionally present.

20. The process of claim 19 wherein said solvent is used to dissolve or slurry component (2) prior to its addition to the reaction mixture.

21. The process of claims 10, 11, 12, 13, 14, 15, 16, 17, 18 or 19 wherein a catalytic amount of one or more advancement catalysts are additionally present.

22. The process of claims 10, 11, 12, 13, 14, 15, 16, 17, 18, 19, 20 or 21 wherein a catalytic amount of one or more transesterification catalysts are additionally present.

* * * * *

UNITED STATES PATENT AND TRADEMARK OFFICE
CERTIFICATE OF CORRECTION

PATENT NO. : 4,766,184
DATED : August 23, 1988
INVENTOR(S) : Robert E. Hefner, Jr.

It is certified that error appears in the above-identified patent and that said Letters Patent is hereby corrected as shown below:

Col. 1, line 39; "terminal polymerizable" should read --and terminal polymerizable--

Col. 2, line 31; "tranesterification induced" should read --transesterification induced--

Col. 2, line 33; "branching and or" should read --branching and/or--

Col. 2, line 58; "of vinyl ester" should read --or vinyl ester--

Col. 3, formula II, that portion of the formula reading

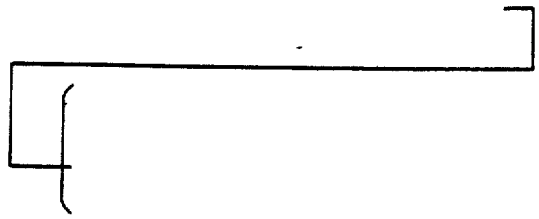

should read

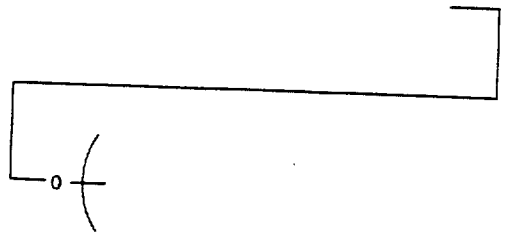

UNITED STATES PATENT AND TRADEMARK OFFICE
CERTIFICATE OF CORRECTION

PATENT NO. : 4,766,184

DATED : August 23, 1988

INVENTOR(S) : Robert E. Hefner, Jr.

It is certified that error appears in the above-identified patent and that said Letters Patent is hereby corrected as shown below:

Col. 3, formula IV, that portion of the formula reading

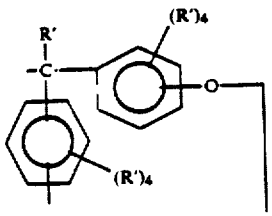

should read

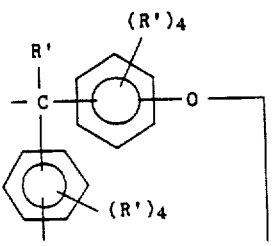

UNITED STATES PATENT AND TRADEMARK OFFICE
CERTIFICATE OF CORRECTION

PATENT NO. : 4,766,184

DATED : August 23, 1988

INVENTOR(S) : Robert E. Hefner, Jr.

It is certified that error appears in the above-identified patent and that said Letters Patent is hereby corrected as shown below:

Col. 8, line 3; "condensation (novolacs) products," should read --condensation products,--

Col. 9, line 4; "as for" should read --as, for--

Col. 10, line 50; "resin via oon-" should read --resin via con- --

Col. 11, line 22; "quantity of frm" should read --quantity of from--

Col. 15, Line 46; "EEW of 58.72." should read --EEW of 258.72. --

Col. 18, line 7; "and or crosslinking" should read --and/or crosslinking--

Col. 18, formula II, that portion of the formula reading

should read

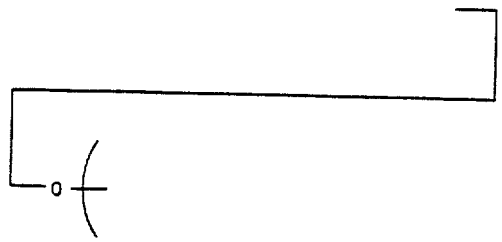

UNITED STATES PATENT AND TRADEMARK OFFICE
CERTIFICATE OF CORRECTION

PATENT NO. : 4,766,184

DATED : August 23, 1988

INVENTOR(S) : Robert E. Hefner, Jr.

It is certified that error appears in the above-identified patent and that said Letters Patent is hereby corrected as shown below:

Col. 19, formula IV, that portion of the formula reading

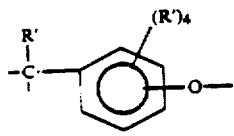   should read   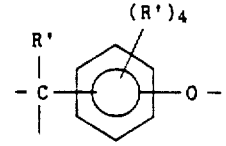

and that portion of the formula reading

-O-⎤                should read                -O-⎤
   ⎦                                              ⎦

UNITED STATES PATENT AND TRADEMARK OFFICE
CERTIFICATE OF CORRECTION

PATENT NO. : 4,766,184

DATED : August 23, 1988

INVENTOR(S) : Robert E. Hefner, Jr.

It is certified that error appears in the above-identified patent and that said Letters Patent is hereby corrected as shown below:

Column 19, line 61, "3. A is selected" should read -- A is selected --.

Signed and Sealed this

Fourteenth Day of March, 1989

Attest:

DONALD J. QUIGG

Attesting Officer        Commissioner of Patents and Trademarks